(12) United States Patent
Zhang et al.

(10) Patent No.: US 10,785,741 B2
(45) Date of Patent: Sep. 22, 2020

(54) REGISTRATION METHOD FOR BROADCAST RECEIVER, TERMINAL AND STORAGE MEDIUM

(71) Applicant: Guangdong OPPO Mobile Telecommunications Corp., Ltd., Dongguan, Guangdong (CN)

(72) Inventors: Jun Zhang, Guangdong (CN); Liangjing Fu, Guangdong (CN); Zhiyong Lin, Guangdong (CN); Runsheng Pei, Guangdong (CN); Ruyu Wu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/565,390

(22) Filed: Sep. 9, 2019

(65) Prior Publication Data

US 2020/0008166 A1 Jan. 2, 2020

Related U.S. Application Data

(63) Continuation of application No. PCT/CN2017/107188, filed on Oct. 21, 2017.

(30) Foreign Application Priority Data

Mar. 10, 2017 (CN) .......................... 2017 1 0141314

(51) Int. Cl.
*H04W 60/00* (2009.01)
*H04H 40/09* (2008.01)
(Continued)

(52) U.S. Cl.
CPC ........ *H04W 60/00* (2013.01); *G06F 16/2379* (2019.01); *G06F 16/24564* (2019.01); *G06F 16/285* (2019.01); *H04H 40/09* (2013.01)

(58) Field of Classification Search
CPC .......... G06F 16/2379; G06F 16/24564; G06F 16/285; G06F 9/54; G06F 9/542;
(Continued)

(56) References Cited

U.S. PATENT DOCUMENTS 9,479,742 B2 10/2016 Baek et al.
10,635,510 B2 * 4/2020 Huang ...................... G06F 9/48
(Continued)

FOREIGN PATENT DOCUMENTS

CN 1816971 A 8/2006
CN 101911538 A 12/2010
(Continued)

OTHER PUBLICATIONS

European search report, EP17899416.6, dated Nov. 21, 2019 (13 pages).
(Continued)

*Primary Examiner* — Tan H Trinh

(57) ABSTRACT

A method of registration for a broadcast receiver, a terminal and a non-transitory computer readable storage medium are provided. The method includes: classifying a broadcast sender according to a frequency of a broadcast message sent by the broadcast sender and called by a broadcast recipient, and recording the broadcast sender and a type of the broadcast sender determined in a classification result; querying, after obtaining a registration instruction of the broadcast receiver and according to a registration object in a registration instruction, the type of the broadcast sender corresponding to the registration object from the classification result; and processing, according to the type of the broadcast sender, the registration of the broadcast receiver.

20 Claims, 4 Drawing Sheets

(51) Int. Cl.
   *G06F 16/28*      (2019.01)
   *G06F 16/2455*    (2019.01)
   *G06F 16/23*      (2019.01)

(58) Field of Classification Search
   CPC . H04H 40/09; H04L 65/1073; H04L 65/4076; H04W 60/00
   USPC .......... 455/41.2, 456.2; 705/14.36; 709/206; 725/34; 370/311
   See application file for complete search history.

(56) References Cited

U.S. PATENT DOCUMENTS

| | | | | |
|---|---|---|---|---|
| 2004/0107446 | A1* | 6/2004 | Yoshii | G06F 9/451 725/132 |
| 2006/0059231 | A1* | 3/2006 | Takatori | G06Q 10/107 709/206 |
| 2010/0262651 | A1* | 10/2010 | Nguyen | H04L 67/34 709/203 |
| 2010/0311442 | A1* | 12/2010 | Epstein | H04M 1/72527 455/466 |
| 2011/0177829 | A1* | 7/2011 | Platt | H04L 51/04 455/456.2 |
| 2012/0303439 | A1* | 11/2012 | Flitcroft | H04M 3/42153 705/14.36 |
| 2013/0217332 | A1* | 8/2013 | Altman | H04W 12/04 455/41.2 |
| 2013/0217333 | A1* | 8/2013 | Sprigg | H04W 4/80 455/41.2 |
| 2013/0308781 | A1* | 11/2013 | Kristiansson | H04W 4/06 380/270 |
| 2015/0058330 | A1* | 2/2015 | Carroll | H04L 61/3025 707/723 |
| 2015/0095945 | A1* | 4/2015 | Nagahama | H04N 21/812 725/34 |
| 2015/0370915 | A1* | 12/2015 | Kim | H04L 61/103 370/311 |
| 2016/0285854 | A1* | 9/2016 | Hu | G08B 13/22 |
| 2016/0323170 | A1* | 11/2016 | Hu | H04L 12/1886 |
| 2019/0199648 | A1* | 6/2019 | Chen | H04L 47/806 |

FOREIGN PATENT DOCUMENTS

| | | |
|---|---|---|
| CN | 104516806 | 4/2015 |
| CN | 104994481 A | 10/2015 |
| CN | 105204949 A | 12/2015 |
| CN | 105208590 A | 12/2015 |
| CN | 105335243 A | 2/2016 |
| CN | 105897438 A | 8/2016 |
| CN | 106201740 A | 12/2016 |
| CN | 106936826 A | 7/2017 |

OTHER PUBLICATIONS

Guan Gan et al: "The Research of Android Broadcast Intercept technology based on priority",Multimedia Information Networking and Security (MINES), 2012 Fourth Information Conference On, IEEE,Nov. 2, 2012 (Nov. 2, 2012) ,pp. 556-559.
International search report for PCT/CN2017/107188, dated Jan. 19, 2018 (2 pages).
English translation of First Office Action in a counterpart Chinese patent Application 201710141314_7, dated May 29, 2019 (5 pages).

* cited by examiner

REGISTRATION METHOD FOR BROADCAST RECEIVER, TERMINAL AND STORAGE MEDIUM

CROSS-REFERENCE TO RELATED APPLICATION(S)

The present application is a continuation of International Patent Application No. PCT/CN2017/107188, filed on Oct. 21, 2017, which claims foreign priority to Chinese Patent Application No. 201710141314.7, filed on Mar. 10, 2017, the entire contents of both of which are hereby incorporated by reference in their entireties.

TECHNICAL FIELD

The present disclosure relates to the field of computer technologies, and in particular to a registration method for a broadcast receiver, a terminal and a storage medium.

BACKGROUND

Broadcast is an information transmission mechanism widely used among applications. As an example of Android system, data transmission and sharing among applications may be performed through broadcasts. Typical examples may be Android inherent texts, phones, and other broadcasts.

In Android system, a broadcast sender may invoke the sendBroadcast function to perform sending of broadcast messages, and a broadcast receiver may invoke the registerReceiver function to perform registration of the broadcast receiver and define broadcast messages of interest, such that desired broadcast messages may be received.

SUMMARY

Embodiments of the present disclosure provide a registration method for a broadcast receiver, a terminal and a storage medium, which could improve efficiency of processing broadcast, reduce consumption of systemic resources, and improve stability of the system.

According to a first aspect, embodiments of the present disclosure may provide a registration method for a broadcast receiver, the method may include actions or operations as follows. A broadcast sender according to a frequency of a broadcast message sent by the broadcast sender and called by a broadcast recipient may be classified, and the broadcast sender and a type of the broadcast sender determined in a classification result may be recorded. After obtaining a registration instruction of the broadcast receiver and according to a registration object in a registration instruction, the type of the broadcast sender corresponding to the registration object may be queried from the classification result. According to the type of the broadcast sender, the registration of the broadcast receiver may be processed.

According to a second aspect, embodiments of the present disclosure may provide a terminal, the terminal may include a processor, a non-transitory memory, and a computer program stored in the non-transitory memory and executed by the processor, wherein the processor is arranged to execute the computer program to perform actions or operations as follows. A registration instruction of a broadcast receiver, wherein the registration instruction comprises a registration object may be obtained. According to the registration object in the registration instruction and a predetermined classification result, a type of a broadcast sender corresponding to the registration object may be determined. According to the type of the broadcast sender, the registration of the broadcast receiver may be processed.

According to a third aspect, embodiments of the present disclosure may provide a storage medium, storing a plurality of instructions that, when executed by a computer, cause the computer to perform a registration method for a broadcast receiver described above.

BRIEF DESCRIPTION OF DRAWINGS

By reading detailed description of the following appended figures about non-restrictive embodiments, other features, aims, and advantages of the present disclosure may become more apparent.

DETAILED DESCRIPTION

Figure 1:
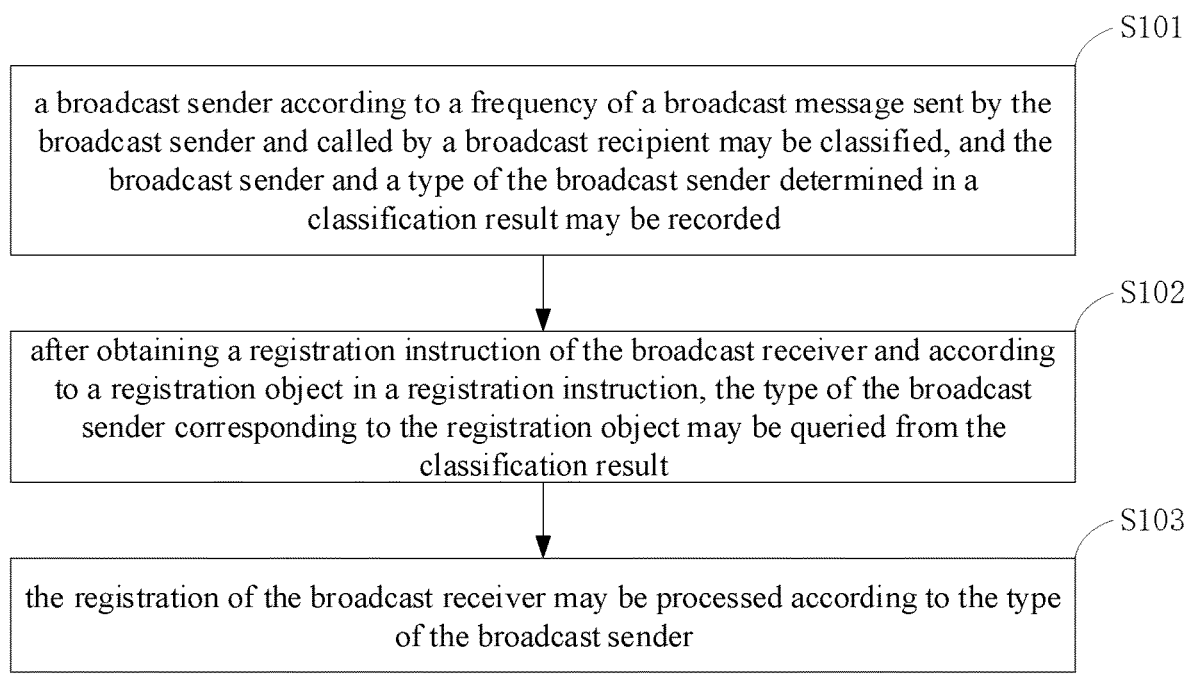
FIG. 1 is a flow chart illustrating a registration method for a broadcast receiver according to an embodiment of the present disclosure.

The present disclosure is to be further described in details by referring to appended figures and embodiments. To be understood that, the embodiments described herein are for the purposes of explaining, but not to limit, the present disclosure. Further to be noted that, for an easy illustration, figures do not show an entire structure, but only a part of the structure that is related to the present disclosure.

Embodiments of the present disclosure may provide a registration method for a broadcast receiver, the method may include actions or operations as follows.

A broadcast sender according to a frequency of a broadcast message sent by the broadcast sender and called by a broadcast recipient may be classified, and the broadcast sender and a type of the broadcast sender determined in a classification result may be recorded.

After obtaining a registration instruction of the broadcast receiver and according to a registration object in a registration instruction, the type of the broadcast sender corresponding to the registration object may be queried. In some embodiments, the type of the broadcast sender corresponding to the registration object may be queried from the classification result.

The registration of the broadcast receiver may be processed according to the type of the broadcast sender.

In some embodiments, the actions that a broadcast sender according to a frequency of a broadcast message sent by the broadcast sender and called by a broadcast recipient may be classified may further include options as follows.

When the frequency of a broadcast message sent by the broadcast sender and called by a broadcast recipient is greater than a first preset frequency, the type of the broadcast sender may be determined as a high-risk type.

When the frequency of a broadcast message sent by the broadcast sender and called by a broadcast recipient is greater than a second preset frequency and less than or equal to the first preset frequency, the type of the broadcast sender may be determined as a risk type.

When the frequency of a broadcast message sent by the broadcast sender and called by a broadcast recipient is less than or equal to the second preset frequency, the type of the broadcast sender may be determined as a common type.

In some embodiments, the action that according to the type of the broadcast sender, the registration of the broadcast receiver may be processed may include the following operations.

When the type of the broadcast sender is the high-risk type, when the type of the broadcast sender is the high-risk type may be prohibited.

When the type of the broadcast sender is the risk type, whether the broadcast recipient of the broadcast receiver is a preset broadcast recipient may be determined; and when the broadcast recipient of the broadcast receiver is the preset broadcast recipient, the registration of the broadcast receiver may be permitted.

When the type of the broadcast sender is the common type, the registration of the broadcast receiver may be permitted.

In some embodiments, the registration method for the broadcast receiver may further include actions or operations as follows.

Values of the first preset frequency and the second preset frequency may be adjusted according to a system load.

In some embodiments, action that the type of the broadcast sender corresponding to a registration object may be queried according to the registration object in a registration instruction may include the following operations.

A type of the broadcast recipient registering the broadcast receiver may be determined. When the type of the broadcast recipient is a preset type, the type of the broadcast sender corresponding to the registration object may be queried according to the registration object in the registration instruction. The preset type may include a third-party application.

In some embodiments, action that the type of the broadcast sender corresponding to a registration object may be queried according to the registration object in a registration instruction may include the following operations.

A type of the broadcast recipient registering the broadcast receiver may be determined. When the type of the broadcast recipient is a system program, the registration of the broadcast receiver may be completed.

In some embodiments, action that the broadcast sender and a type of the broadcast sender determined in a classification result may be recorded may include the operations as follows.

The type of the broadcast sender may be redetermined after a preset time, and a recording result may be updated.

In some embodiments, the frequency of the broadcast message sent by the broadcast sender and called by a broadcast recipient is determined by one of: the number of times that the broadcast message is called by a broadcast recipient within a fixed time; and the number of broadcast recipients that receive the broadcast message within a fixed time.

In some embodiments, when a size of the system load is less than a preset size, the values of the first preset frequency and the second preset frequency are adjusted to increase; and when the size of the system load is greater than the preset size, the values of the first preset frequency and the second preset frequency are adjusted to reduce.

In some embodiments, the action that the prohibiting the registration of the broadcast receiver may further include the registration of the broadcast receiver may be restricted during a registration phase, and the registration instruction of the broadcast receiver may be shielded.

FIG. 1 is a flow chart illustrating a registration method for a broadcast receiver according to an embodiment of the present disclosure. The present embodiment may be applicable to control a generation process of a broadcast queue. The method may be performed by a terminal provided by an embodiment of the present disclosure. The terminal may have an apparatus of generating the broadcast queue, wherein the apparatus may be in a form of software and/or hardware. As shown in FIG. 1, technical solution provided by the present embodiment is to be described hereafter.

In block S101, a broadcast sender according to a frequency of a broadcast message sent by the broadcast sender and called by a broadcast recipient may be classified, and the broadcast sender and a type of the broadcast sender determined in a classification result may be recorded.

During processing the broadcast, a service process of the broadcast sender may invoke the sendBroadcast function to send the broadcast message to a management module (such as ActivityManagerService). The management module may place the broadcast message into a broadcast sending queue after receiving the broadcast message. Through a process communication mechanism (such as the Binder process communication mechanism), the management module may then send the broadcast message in the broadcast sending queue to a broadcast receiver, which meet conditions for receiving the broadcast message.

In the broadcast mechanism, broadcast messages may refer to information, which may be transmitted between the system and the applications while the system or the applications are running. To be exemplary, broadcast messages may be a broadcast message indicating system startup, a broadcast message of texts, a broadcast message of a phone call, or broadcast messages of third-party applications or the like. A process of a broadcast sender sending a broadcast message and a process of a broadcast receiver receiving a broadcast message may be performed asynchronously. Through a management module, the broadcast sender and the broadcast receiver may be coupled with each other at a lower degree, which means, after sending the broadcast message, the broadcast sender may not concern about which specific broadcast receiver is to receive the message, and the broadcast receiver may receive the broadcast message of interest without concerning about which specific broadcast sender sends the message. Therefore, some third-party applications could register a large number of broadcasts of interest. After the broadcast messages are sent, the third-party applications may receive and process them to implement program processing for self-starting or other purposes, resulting in unnecessary waste of system resources.

In block S101, statistics of the frequency of the broadcast message sent by the broadcast sender and called by a broadcast recipient may be performed. For example, the number of the times that the broadcast message sent by the broadcast sender is called by a broadcast recipient within a fixed time (for example, 1 day) may be counted and recorded, or the number of broadcast recipients that receive the broadcast message within a fixed time (for example, 1 day) may be counted and recorded.

To be specific, in an example, a counter application may be used as a broadcast sender, a process of the counter to send a broadcast message may be shown as the following.

//a broadcast message may be generated
Inent intent=new Intent (BROADCAST_COUNTER_ACTION)

```
//parameters of the counter and a corresponding count
value may be transmitted
    intent.putExtra (COUNTER_VALUE, counter);
    //the broadcast message may be sent
    sendBroadcast (intent)
```

Correspondingly, the broadcast recipient needs to register the broadcast receiver thereof if the broadcast recipient wants to receive the broadcast. A process of the registration of the broadcast receiver may be shown as the following.

```
//A broadcast message of interest will be defined (broadcast message subscription)
    IntentFilter counter ActionFilter=
    new IntentFilter(CounterService.BROADCAST_COUNTER_ACTION);
    //Registration of the broadcast receiver may be performed
    registerReceiver(counterActionReceiver,counterActionFilter)
```

After the broadcast message (BROADCAST_COUNTER_ACTION) sent by the broadcast sender is sent by the management module, since the broadcast recipient has registered the corresponding broadcast receiver for receiving the broadcast message, the broadcast message may be received and called by the corresponding broadcast receiver. After the broadcast recipient completes one reception and call, one recording may be made, the recording contents may include the times of call by the broadcast recipients and the corresponding recipients. The frequency of the broadcast message sent by the broadcast sender and called by the broadcast recipient could be determined according to the statistics of the times and/or the number of the corresponding broadcast recipients within a fixed time (for example, 1 day) in the recording.

In some embodiments, after the frequency of the broadcast message sent by the broadcast sender and called by the broadcast recipient is determined, the broadcast recipient could be classified according to the frequency. Alternatively, if the frequency of the broadcast message sent by the broadcast sender and called by the broadcast recipient is greater than a first preset frequency (may be 100 times/day), the type of the broadcast recipient may be determined to be a high-risk type. If the frequency of the broadcast message sent by the broadcast sender and called by the broadcast recipient is greater than a second preset frequency (may be 50 times/day), and less than or equal to the first preset frequency, the type of the broadcast recipient may be determined to be a risk type. If the frequency of the broadcast message sent by the broadcast sender and called by a broadcast recipient is less than or equal to the second preset frequency, the type of the broadcast recipient may be determined to be a common type.

For example, taking the terminal as a mobile phone as an example, statistics show that: bright screen broadcast, blackout broadcast, and unlocked broadcast are called at a higher frequency (greater than 100 times/day), and then each of the bright screen broadcast, blackout broadcast, and unlocked broadcast may be determined as a high-risk type broadcast message, and the type of each of the corresponding broadcast senders may be determined as a high-risk type; network status-changing broadcast, Bluetooth status-changing broadcast, and telephone status-changing broadcast are called at a medium frequency (more than 50 times/day, and less than or equal to 100 times/day), and then each of the network status-changing broadcast, the Bluetooth status-changing broadcast, and the telephone status-changing broadcast may be determined as a risk type broadcast message, and the type of each of the corresponding broadcast senders may be determined as a risk type; language-switching broadcast and topic-switching broadcast are called at a less frequently (less than or equal to 50 times/day), and then each of the language-switching broadcast and the topic-switching broadcast may be determined as a common broadcast message, and the type of each of the corresponding broadcast senders may be determined as a common type.

After the broadcast recipients are classified, the broadcast sender and a corresponding type of the broadcast sender determined in the classification result may be recorded and stored.

In block S102, after obtaining a registration instruction of the broadcast receiver and according to a registration object in a registration instruction, the type of the broadcast sender corresponding to the registration object may be queried from the classification result.

In some embodiments, the management module may acquire a registration instruction of the broadcast receiver, the registration instruction of the broadcast receiver may be sent from the broadcast recipient. Usually, the broadcast recipient may register with (subscribe) the management module for desired broadcast messages through the process communication mechanism. Specifically, as recited in block S101, the process communication mechanism of the broadcast recipient may perform the registration of the broadcast receiver in the management module by invoking the registerReceiver function, and at the same time, define the broadcast messages that are of their interest. When the management module sends a broadcast message, which is in a broadcast sending queue, the broadcast message may be sent, based on the registration of broadcast receivers, to a message loop queue corresponding to the broadcast receiver that subscribes the message. After receiving the broadcast message, the broadcast recipient may call back a receiving method (such as the onReceive method) in the registered broadcast receiver to execute corresponded functions, so as to process the received broadcast message.

In some embodiments, after the registration instruction of the broadcast receiver is obtained, the broadcast sender that sent the broadcast message may be determined according to the corresponding registration object (which may be the name of the broadcast message of interest) in the registration instruction. Exemplarily, the broadcast sender A may send a broadcast message al, the registration object in the registration instruction of the broadcast recipient B may be al, and the broadcast sender corresponding to the broadcast message al can be determined according to the registration object al. In some embodiments, the registration instruction may be registered in the management module (static registration instruction), or may be registered in the application of the broadcast recipient (dynamic registration instruction). It should be noted that, in some embodiments, the corresponding broadcast sender is determined by analyzing the existing registration instruction at the time of registration of the broadcast receiver, and there is no need to perform additional operation when the broadcast recipient registers the broadcast receiver.

In block S103, the registration of the broadcast receiver may be processed according to the type of the broadcast sender.

In block S103, the queried type of the broadcast sender may be the type of the corresponding broadcast sender classified and recorded in S101. The action that the registration of the broadcast receiver may be processed may include the registration instruction may be responded to, and the registration of the corresponding broadcast receiver according to registration contents of the registration instruction may be performed, so that the broadcast recipient could receive the corresponding broadcast message by the registered broadcast receiver. The action that the registration of the broadcast receiver may be processed may also include the registration of the broadcast receiver may be prohibited, such that the broadcast recipient cannot complete the registration of the broadcast receiver and thus cannot complete the reception of the corresponding broadcast message.

In some embodiments, if the type of the broadcast sender is the high-risk type, the registration of the broadcast receiver may be prohibited; if the type of the broadcast sender is the risk type, whether the broadcast recipient is a preset broadcast recipient may be determined, and the registration of the broadcast receiver may be permitted when the broadcast recipient is the preset broadcast recipient; if the type of the broadcast sender is of a common type, the registration of the broadcast receiver may be permitted. Since a broadcast message of a high-risk type (a broadcast message type of which a broadcast message is called frequently) is received by a registered broadcast receiver of a broadcast recipient, unnecessary broadcast message processing may be brought, and furthermore, some broadcast recipients being not running or running in the background may be pulled up, which would increase the running load of the system. Therefore, the prohibition for the registration of the broadcast receiver of this type could optimize the broadcast processing mechanism, improve the broadcast processing efficiency, and reduce the system resource consumption.

It should be noted that, in some embodiments, the solution is to process the registration of the broadcast receiver, that is, the registration of the broadcast receiver is restricted during the registration phase of the broadcast receiver, and the registration of the broadcast receiver is restricted such that the registration behavior during the registration phase cannot be completed. Exemplarily, the registration instruction of the broadcast receiver may be shielded.

The embodiments provide a registration method for a broadcast receiver, the broadcast sender may be classified according to the frequency of the broadcast message sent by the broadcast sender and called by the broadcast receiver, the broadcast sender and a corresponding type of the broadcast sender determined in a classification result may be recorded. After the registration instruction of the broadcast receiver is obtained, the type of the broadcast sender corresponding to the registered object may be queried according to the registration object in the registration instruction. The registration of the broadcast receiver may be processed according to the type of the broadcast sender that is queried. The method could restrict the registration of the broadcast receiver, and in this method, it is needed to consider the type of the broadcast sender corresponding to the registration instruction in the registration process, thereby improving the security of the registration of the broadcast receiver in the system, avoiding the problem of excessive resource consumption in the subsequent broadcast message processing caused by the successfully registration of all broadcast recipients, and improving the stability of the system.

Figure 2:
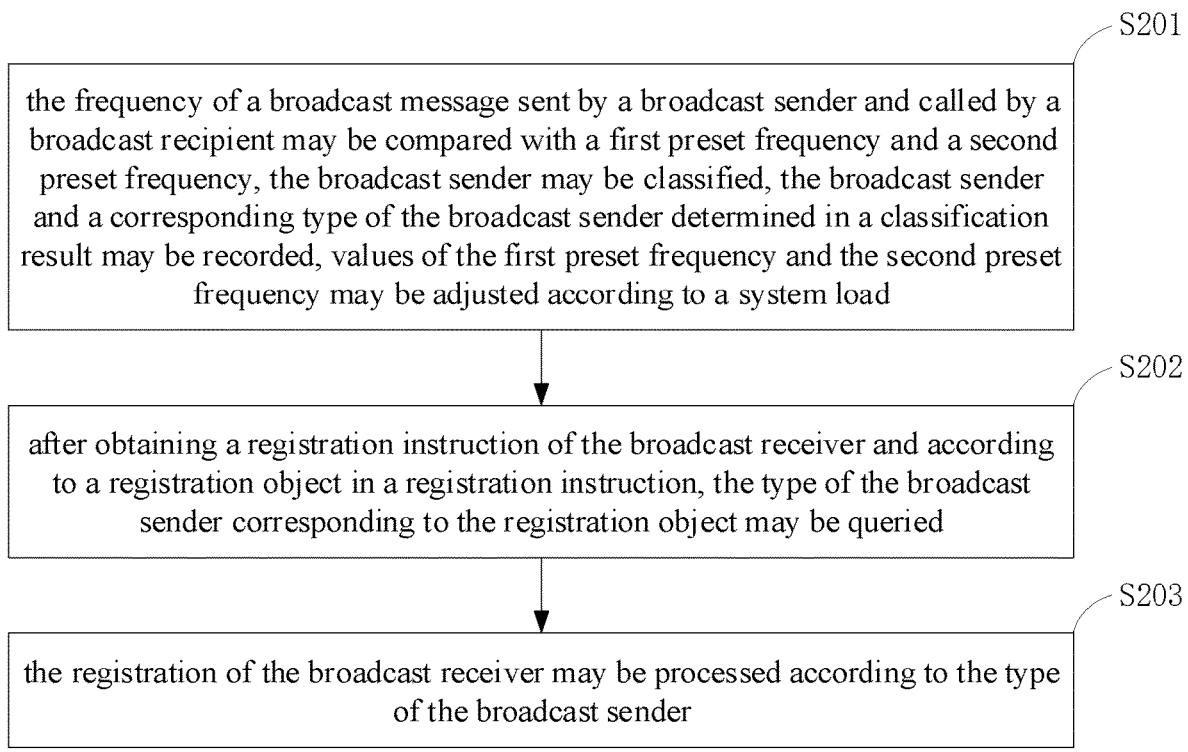
FIG. 2 is a flow chart illustrating a registration method for a broadcast receiver according to another embodiment of the present disclosure.

FIG. 2 is a flow chart illustrating a registration method for a broadcast receiver according to another embodiment of the present disclosure. Based on the above embodiments, values of the first preset frequency and the second preset frequency may be adjusted according to a system load.

Based on the above optimization, as shown in FIG. 2, the technical solution provided by some embodiments is specifically as follows.

In block S201, the frequency of a broadcast message sent by a broadcast sender and called by a broadcast recipient may be compared with a first preset frequency and a second preset frequency, the broadcast sender may be classified, the broadcast sender and a corresponding type of the broadcast sender determined in a classification result may be recorded, values of the first preset frequency and the second preset frequency may be adjusted according to a system load.

In some embodiments, after the broadcast sender and the corresponding type of the broadcast sender determined in the classification result are recorded, the method may further include: the type of the broadcast sender may be redetermined after a preset time, and a recording result may be updated.

In some embodiments, the system load may be acquired at a fixed time (such as 0:00 every day) or every fixed time period (such as 48 hours). Size of the system load may be determined comprehensively based on CPU usage, memory usage, and the number of applications that are running and the remaining power. Exemplarily, the higher the system load is, the greater the values of the first preset frequency (which may be 120 times/day) and the second preset frequency (which may be 80 times/day) should be adjusted to reduce, so as to reduce the number of the message received by the broadcast register. When the system load is reduced, the frequency values of the first preset frequency (which may be 50 times/day) and the second preset frequency (which may be 25 times/day) should be adaptively adjusted to increase, such that more broadcast receivers could be responded and registered. The values of the first preset frequency and the second preset frequency may also be reduced when the system load is detected to meet the preset condition (for example, if the CPU usage is greater than 80%, the memory usage is greater than 80% or the system power is less than 20%).

In block S202, after obtaining a registration instruction of the broadcast receiver and according to a registration object in a registration instruction, the type of the broadcast sender corresponding to the registration object may be queried.

In block S203, the registration of the broadcast receiver may be processed according to the type of the broadcast sender.

Embodiments of the present disclosure provide a registration method for a broadcast receiver, the broadcast sender may be classified according to the comparison between the frequency of a broadcast message sent by the broadcast sender and called by a broadcast and the first preset frequency, and between the frequency of a broadcast message sent by the broadcast sender and called by a broadcast and the second preset frequency. The broadcast sender and a corresponding type of the broadcast sender determined in a classification result may be recorded. The values of the first preset frequency and the second preset frequency may be adjusted according to the system load. Therefore, the deficiencies of the broadcast recipient when receiving the broadcast sent by the broadcast sender could be solved. The flexibility of the broadcast processing mechanism could be increased, while the efficiency of the broadcast processing is improved, resulting in that system stability could be increased.

Figure 3:
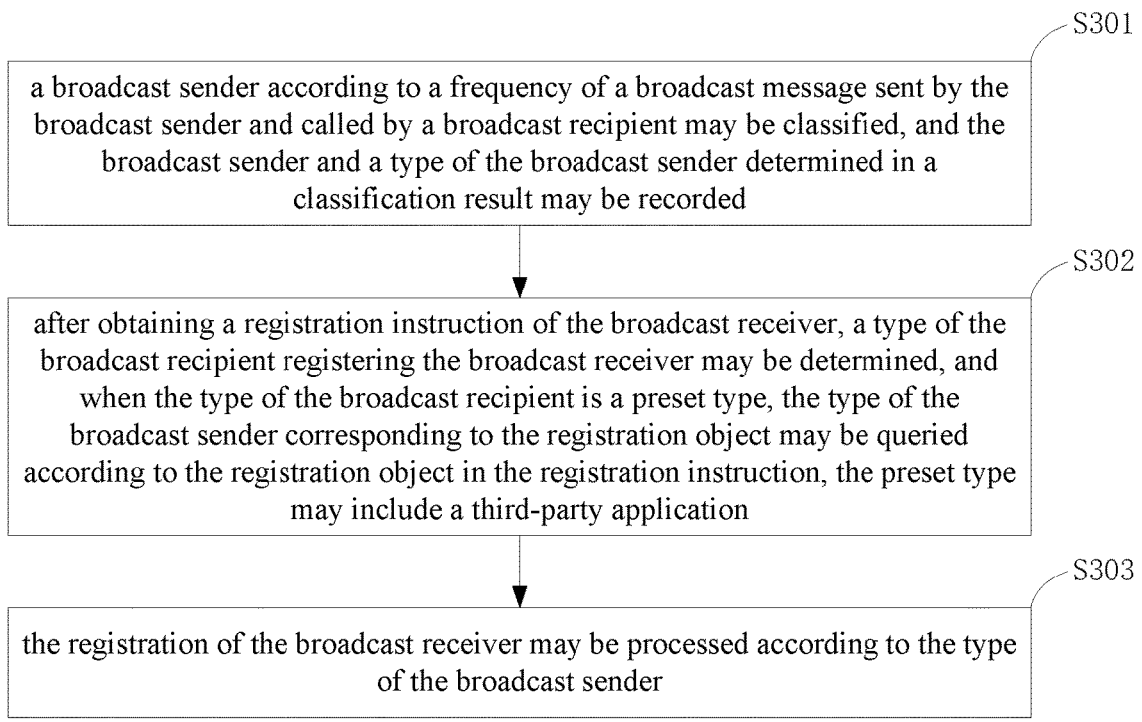
FIG. 3 is a flow chart illustrating a registration method for a broadcast receiver according to still another embodiment of the present disclosure.

FIG. 3 is a flow chart illustrating a registration method for a broadcast receiver according to still another embodiment of the present disclosure. Based on the above embodiments, alternatively, querying the type of the broadcast sender corresponding to the registration object according to a registration object in a registration instruction may include:

A type of the broadcast recipient registering the broadcast receiver may be determined, and when the type of the broadcast recipient is a preset type, the type of the broadcast sender corresponding to the registration object may be queried according to the registration object in the registration instruction. The preset type may include a third-party application.

Based on the above optimization, as shown in FIG. 3, technical solutions provided by the present embodiment may include following operations.

In block S301, a broadcast sender according to a frequency of a broadcast message sent by the broadcast sender and called by a broadcast recipient may be classified, and the broadcast sender and a type of the broadcast sender determined in a classification result may be recorded.

In block S302, after obtaining a registration instruction of the broadcast receiver, a type of the broadcast recipient registering the broadcast receiver may be determined, and when the type of the broadcast recipient is a preset type, the type of the broadcast sender corresponding to the registration object may be queried according to the registration object in the registration instruction, the preset type may include a third-party application.

In some embodiments, when the registration instruction of the broadcast receiver is processed, a determination about the type of broadcast recipient registering the broadcast receiver is made. The type may include a broadcast recipient of a third party application type. If the type of the broadcast recipient is a third-party application (or other customized applications), the type of the broadcast sender corresponding to the registered object may be queried according to the registration object in the registration instruction. The determination of the type of the broadcast receiver can be implemented by means of a table lookup. In some embodiments, when the application is installed, the type corresponding to the application will be recorded in the database. After the registration instruction of the broadcast receiver is initiated by the broadcast recipient of the application, the type of the application is firstly queried. When the condition is met, the control process of registering the broadcast receiver is initiated. In some embodiments, if the type of the broadcast recipient that initiated the broadcast receiver registration instruction is a system program, the registration instruction is not controlled but the registration of the broadcast receiver is completed. Therefore, the problem that the broadcast processing efficiency is low, which is caused by that the third-party application registers the broadcast receiver to receive the frequently-transmitted broadcast message, could be effectively avoided. The broadcast receiver registered for the system program still adopts the normal registration mode.

In block S303, the registration of the broadcast receiver may be processed according to the type of the broadcast sender.

The embodiments provide a registration method for a broadcast receiver, After the registration instruction of the broadcast receiver is obtained, the type of the broadcast recipient registering the broadcast receiver may be determined, and when the type of the broadcast recipient is a preset type, the type of the broadcast sender corresponding to the registration object may be queried according to the registration object in the registration instruction. The preset type may include a third-party application. In this way, the deficiencies of the broadcast recipient of the third-party application when receiving the broadcast sent by the broadcast sender could be solved. As a result, the efficiency of the broadcast processing could be improved, the consumption of the systemic resources could be reduced, and the system stability could be increased.

Embodiments of the present disclosure may provide an apparatus of registration for a broadcast receiver, the apparatus may include a classification module, a query module and a registration processing module.

The classification module may be configured to classify a broadcast sender according to a frequency of a broadcast message sent by the broadcast sender and called by a broadcast recipient, and record the broadcast sender and a type of the broadcast sender determined in a classification result.

The query module may be configured to query, after obtaining a registration instruction of the broadcast receiver and according to a registration object in a registration instruction, the type of the broadcast sender corresponding to the registration object.

The registration processing module may be configured to process the registration of the broadcast receiver according to the type of the broadcast sender.

In some embodiments, the classification module may be configured to: determine the type of the broadcast sender as a high-risk type, when the frequency of a broadcast message sent by the broadcast sender and called by a broadcast recipient is greater than a first preset frequency; determine the type of the broadcast sender as a risk type, when the frequency of a broadcast message sent by the broadcast sender and called by a broadcast recipient is greater than a second preset frequency and less than or equal to the first preset frequency; and determine the type of the broadcast sender as a common type, when the frequency of a broadcast message sent by the broadcast sender and called by a broadcast recipient is less than or equal to the second preset frequency.

In some embodiments, the registration processing module may be configured to: prohibit the registration of the broadcast receiver when the type of the broadcast sender is the high-risk type; determine whether the broadcast recipient of the broadcast receiver is a preset broadcast recipient when the type of the broadcast sender is the risk type, and permit the registration of the broadcast receiver when the broadcast recipient of the broadcast receiver is the preset broadcast recipient; and permit the registration of the broadcast receiver when the type of the broadcast sender is the common type.

In some embodiments, the apparatus may further include a frequency setting module configured to adjust values of the first preset frequency and the second preset frequency according to a system load.

In some embodiments, the query module may be configured to: determine a type of the broadcast recipient registering the broadcast receiver; and query, when the type of the broadcast recipient is a preset type and according to the registration object in the registration instruction, the type of the broadcast sender corresponding to the registration object; wherein the preset type comprises a third-party application.

In some embodiments, the apparatus may further include an updating module configured to redetermine the type of the broadcast sender after a preset time and update a recording result, after the classification module records the broadcast sender and a type of the broadcast sender determined in a classification result.

Figure 4:
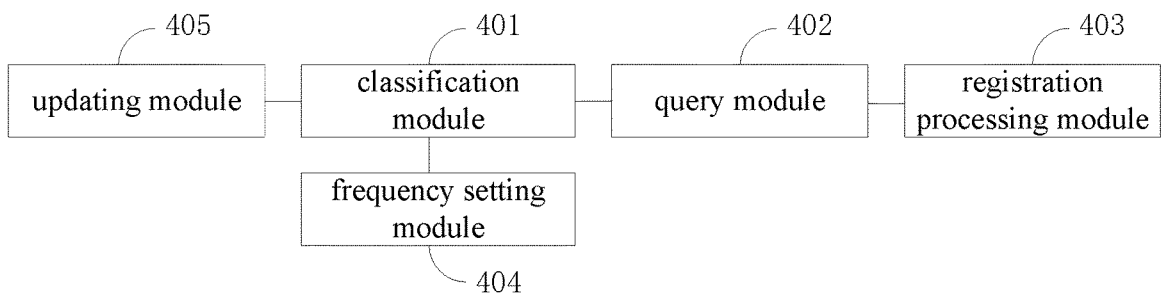
FIG. 4 is a structural diagram of an apparatus of registration for a broadcast receiver according to an embodiment of the present disclosure.

FIG. 4 is a structural diagram of an apparatus of registration for a broadcast receiver according to an embodiment of the present disclosure. The apparatus may be used to execute the registration method for the broadcast receiver as described above, may contain corresponded functional modules to execute the method, and may achieve the beneficial effects. As shown in FIG. 4, the apparatus may include a classification module 401, a query module 402 and a registration processing module 403.

The classification module 401 may be configured to classify a broadcast sender according to a frequency of a broadcast message sent by the broadcast sender and called by a broadcast recipient, and record the broadcast sender and a type of the broadcast sender determined in a classification result.

The query module 402 may be configured to query, after obtaining a registration instruction of the broadcast receiver and according to a registration object in a registration instruction, the type of the broadcast sender corresponding to the registration object.

The registration processing module 403 may be configured to process the registration of the broadcast receiver according to the type of the broadcast sender.

In the embodiments of the present disclosure, the broadcast sender may be classified according to the frequency of the broadcast message sent by the broadcast sender and called by the broadcast receiver, the broadcast sender and a corresponding type of the broadcast sender determined in a classification result may be recorded. After the registration instruction of the broadcast receiver is obtained, the type of the broadcast sender corresponding to the registered object may be queried according to the registration object in the registration instruction. The registration of the broadcast receiver may be processed according to the type of the broadcast sender that is queried. The method could restrict the registration of the broadcast receiver, and in this method, it is needed to consider the type of the broadcast sender corresponding to the registration instruction in the registration process, thereby improving the security of the registration of the broadcast receiver in the system, avoiding the problem of excessive resource consumption in the subsequent broadcast message processing caused by the successfully registration of all broadcast recipients, and improving the stability of the system.

Alternatively, the classification module 401 may be configured to: determine the type of the broadcast sender as a high-risk type, when the frequency of a broadcast message sent by the broadcast sender and called by a broadcast recipient is greater than a first preset frequency; determine the type of the broadcast sender as a risk type, when the frequency of a broadcast message sent by the broadcast sender and called by a broadcast recipient is greater than a second preset frequency and less than or equal to the first preset frequency; and determine the type of the broadcast sender as a common type, when the frequency of a broadcast message sent by the broadcast sender and called by a broadcast recipient is less than or equal to the second preset frequency.

Alternatively, the registration processing module 403 may be configured to: prohibit the registration of the broadcast receiver when the type of the broadcast sender is the high-risk type; determine whether the broadcast recipient of the broadcast receiver is a preset broadcast recipient when the type of the broadcast sender is the risk type, and permit the registration of the broadcast receiver when the broadcast recipient of the broadcast receiver is the preset broadcast recipient; and permit the registration of the broadcast receiver when the type of the broadcast sender is the common type.

Alternatively, the apparatus may further include a frequency setting module 404 configured to adjust values of the first preset frequency and the second preset frequency according to a system load.

Alternatively, the query module 402 may be configured to: determine a type of the broadcast recipient registering the broadcast receiver; and query, when the type of the broadcast recipient is a preset type and according to the registration object in the registration instruction, the type of the broadcast sender corresponding to the registration object; wherein the preset type comprises a third-party application.

Alternatively, the apparatus may further include an updating module 405 configured to redetermine the type of the broadcast sender after a preset time and update a recording result, after the classification module records the broadcast sender and a type of the broadcast sender determined in a classification result.

Figure 5:
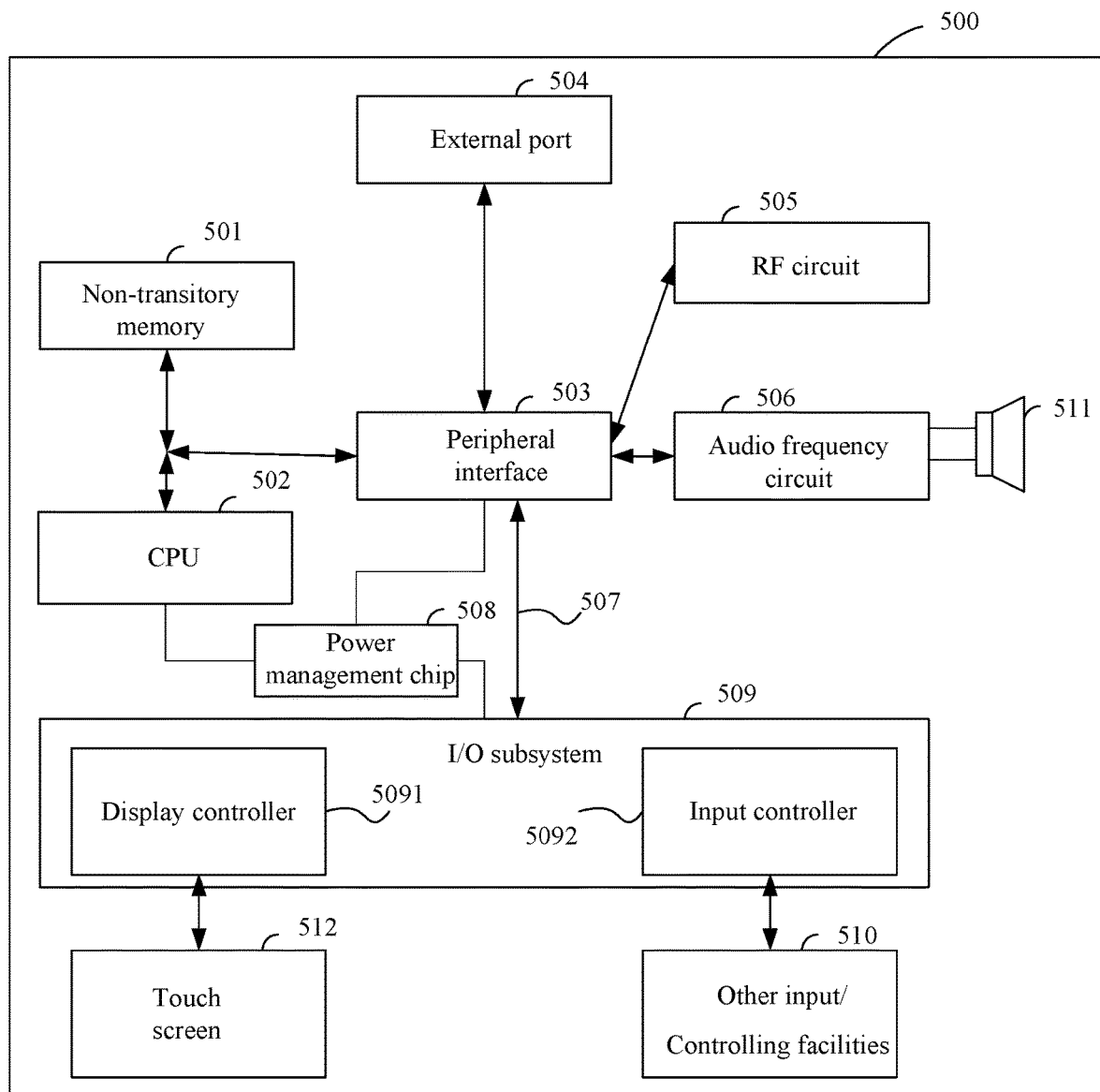
FIG. 5 is a structural diagram of a terminal according to an embodiment of the present disclosure.

On the basis of all the above embodiments, the present embodiment may provide a terminal, which may include the apparatus of generating the broadcast queue. FIG. 5 is a structural diagram of a terminal provided by an embodiment of the present disclosure. As shown in FIG. 5, the terminal may include a non-transitory memory 501, a central processing unit (CPU) 502, a peripheral interface 503, a radio frequency (RF) circuit 505, an audio frequency circuit 506, a loudspeaker 511, a power management chip 508, an input/output (I/O) subsystem 509, a touch screen 512, other input/controlling devices 510, and external ports 504, all of which may communicate through one or more communication buses or signal lines 507.

It should be understood that, the terminal 500 shown in the figure is only an example and may include more or less elements than what are shown in the figure. Two or more of the elements may be combined, or various configurations of the elements may be included. The elements shown in the figure may be in a form of hardware, software or a combination of the hardware and software, which may include one or more signal processors and application specific integrated circuits.

The terminal, which may be used to manage authorities of multiple instances of applications, will be described in details hereafter. A smart phone will be used as an example of the terminal.

The non-transitory memory 501 may be accessed by the CPU 502, the peripheral interface 503, and the like. The non-transitory memory 501 may include a high-speed random access memory or a nonvolatile memory, for example one or more of disk storage devices, flash memory devices, or other volatile solid state memory devices.

The peripheral interface 503 may connect the input and output peripherally to the CPU 502 and the non-transitory memory 501.

The I/O subsystem 509 may configure the input and output to the peripheral. For example, the touch screen 512 and other input/controlling devices 510 may be connected to the peripheral interface 503. The I/O subsystem 509 may include a display controller 5091 and one or more input controllers 5092 to control other input/controlling device 510. The one or more input controllers 5092 may receive electrical signals from other input/controlling devices 510 or send electrical signals to the other input/controlling devices 510. The other input/controlling devices 510 may include physical buttons (pressing buttons, rocker buttons, and the like), dial disks, slide switches, joysticks, and clicking wheels. To be noted that, the input controllers 5092 may be connected to any one of the following devices: a keyboard, an infrared port, a USB port, and a pointing device such as a mouse.

The touch screen 512 may be an interface for input and output between the user terminal the user. Visual output may be displayed to the user, wherein the visual output may include graphs, texts, icons, videos and the like.

The display controller 5091 in the I/O subsystem 509 may receive electric signals from the touch screen 512 or send electric signals to the touch screen 512. The touch screen 512 may detect touches on the touch screen, and the display controller 5091 may transmit the detected touches into an interaction with a user interface object, displayed on the touch screen 512, such that a human-device interaction may be achieved. The user interface object displayed on the touch screen 512 may be an icon to operate a game, an icon to connect to a network, and the like. To be noted that, the device may further include an optical mouse, wherein the optical mouse may be a touch-sensitive surface without displaying visual outputs or an extension of a touch-sensitive surface formed from the touch screen.

The RF circuit 505 may be mainly used to generate communication between the mobile phone and a wireless network (that is a network side), such that data receipt and sending may be performed between the mobile phone and the wireless network, such as receiving and sending messages, emails, and the like. To be specific, the RF circuit 505 may receive and send RF signals, which are also called electromagnetic signals. The RF circuit 505 may transmit the electric signals into the electromagnetic signals or transmit the electromagnetic signals into the electric signals, and communicate with communicational networks other devices through the electromagnetic signals. The RF circuit 505 may include a known circuit, which may be used to execute the above-mentioned functions, including but not limited to an antenna system, an RF transceiver, one or more amplifiers, a network coordinator, one or more oscillators, a digital signal processor, a coder-decoder (CODEC), a chipset, a subscriber identity module (SIM), and the like.

The audio frequency circuit 506 may be used to receive audio data from the peripheral interface 503, transmit the audio data into electric signals, and send the electric signals to the loudspeaker 511.

The loudspeaker 511 may be used for the mobile phone to receive voice signals from the wireless network through the RF circuit 505, the voice signals may be restored into voice to be played to the user.

The power management chip 508 may be used to supply power to and manage power of hardware, which is connected to the CPU 502, I/O subsystem, and the peripheral interface.

The CPU 502, i.e., the processor, provided by the present embodiment may perform following operations.

A broadcast sender according to a frequency of a broadcast message sent by the broadcast sender and called by a broadcast recipient may be classified, and the broadcast sender and a type of the broadcast sender determined in a classification result may be recorded.

After obtaining a registration instruction of the broadcast receiver and according to a registration object in a registration instruction, the type of the broadcast sender corresponding to the registration object may be queried.

The registration of the broadcast receiver may be processed according to the type of the broadcast sender.

In some embodiments, when executing computer programs, the processor may perform the following operations.

When the frequency of a broadcast message sent by the broadcast sender and called by a broadcast recipient is greater than a first preset frequency, the type of the broadcast sender may be determined as a high-risk type.

When the frequency of a broadcast message sent by the broadcast sender and called by a broadcast recipient is greater than a second preset frequency and less than or equal to the first preset frequency, the type of the broadcast sender may be determined as a risk type.

When the frequency of a broadcast message sent by the broadcast sender and called by a broadcast recipient is less than or equal to the second preset frequency, the type of the broadcast sender may be determined as a common type.

In some embodiments, when executing computer programs, the processor may perform the following operations.

When the type of the broadcast sender is the high-risk type, when the type of the broadcast sender is the high-risk type may be prohibited.

When the type of the broadcast sender is the risk type, whether the broadcast recipient of the broadcast receiver is a preset broadcast recipient may be determined; and when the broadcast recipient of the broadcast receiver is the preset broadcast recipient, the registration of the broadcast receiver may be permitted.

When the type of the broadcast sender is the common type, the registration of the broadcast receiver may be permitted.

In some embodiments, when executing computer programs, the processor may perform the following operations.

Values of the first preset frequency and the second preset frequency may be adjusted according to a system load.

In some embodiments, when executing computer programs, the processor may perform the following operations.

A type of the broadcast recipient registering the broadcast receiver may be determined. When the type of the broadcast recipient is a preset type, the type of the broadcast sender corresponding to the registration object may be queried according to the registration object in the registration instruction. The preset type may include a third-party application.

In some embodiments, when executing computer programs, the processor may perform the following operations.

The type of the broadcast sender may be redetermined after a preset time, and a recording result may be updated.

In some embodiments, the terminal may include a processor, a non-transitory memory, and a computer program stored in the non-transitory memory and executed by the processor, wherein the processor is configured to execute the computer program to obtain a registration instruction of a broadcast receiver including a registration object; determine a type of a broadcast sender corresponding to the registration object according to the registration object in the registration instruction and a predetermined classification result; and process the registration of the broadcast receiver according to the type of the broadcast sender.

In some embodiments, the predetermined classification result may be obtained by classifying a broadcast sender according to a frequency of a broadcast message sent by the broadcast sender and called by a broadcast recipient, and recording the broadcast sender and a type of the broadcast sender determined in the classification.

In some embodiments, the processor is further configured to execute the computer program to determine a type of the broadcast recipient registering the broadcast receiver, and complete the registration of the broadcast receiver when the type of the broadcast recipient is a system program.

In some embodiments, the processor is further configured to execute the computer program to adjust the values of the first preset frequency and the second preset frequency to increase when a size of the system load is less than a preset size; and adjust the values of the first preset frequency and the second preset frequency to reduce when the size of the system load is greater than the preset size.

It should be noted that, those skilled in the art may understand that all or part of the steps of the method in the foregoing embodiments may be completed by a program to instruct related hardware, and the program may be stored in a computer readable medium. The medium may include, but is not limited to, a read only memory (ROM), a random access memory (RAM), a disk or a disc, and the like.

A storage medium, storing a plurality of instructions that, when executed by a computer, cause the computer to perform the registration method for the broadcast receiver according to any one of the described embodiments.

In some embodiments, embodiments of the present disclosure may provide a non-transitory storage medium, storing a plurality of instructions that, when executed by a computer, cause the computer to perform a registration method for a broadcast receiver. The method may include obtaining a registration instruction of the broadcast receiver, wherein the registration instruction comprises a registration object; determining a type of a broadcast sender corresponding to the registration object according to the registration object and a classification of the broadcast sender; wherein the broadcast sender is classified according to a frequency of a broadcast message sent by the broadcast sender and called by a broadcast recipient; and processing the registration of the broadcast receiver according to the type of the broadcast sender.

To be noted that, the above description is only about preferred embodiments of the present disclosure and implemented technical principles. Skilled in the art should understand that the present disclosure should not be limited to the specific embodiments described herein. Skilled in the art shall be able to perform any obvious modifications, re-adjustment and replacement to the embodiments without departing from the scope of the present disclosure. Therefore, although the present disclosure may be described in details through the above-mentioned embodiments, the present disclosure should not be limited to the above-mentioned embodiments. Without departing from the concepts of the present disclosure, may other equivalent embodiment may also be included, and the scope of the present disclosure is defined by the claims.

What is claimed is:

1. A method for registering a broadcast receiver, comprising:
   classifying a broadcast sender according to a frequency of a broadcast message sent by the broadcast sender and called by a broadcast recipient, and recording the broadcast sender and a type of the broadcast sender determined in a classification result;
   querying, after obtaining a registration instruction of the broadcast receiver and according to a registration object in a registration instruction, the type of the broadcast sender corresponding to the registration object from the classification result; and
   processing, according to the type of the broadcast sender, the registration of the broadcast receiver.

2. The method according to claim 1, wherein classifying the broadcast sender according to the frequency of the broadcast message sent by the broadcast sender and called by the broadcast recipient comprises:
   determining the type of the broadcast sender as a high-risk type, when the frequency of a broadcast message sent by the broadcast sender and called by a broadcast recipient is greater than a first preset frequency;
   determining the type of the broadcast sender as a risk type, when the frequency of a broadcast message sent by the broadcast sender and called by a broadcast recipient is greater than a second preset frequency and less than or equal to the first preset frequency; and
   determining the type of the broadcast sender as a common type, when the frequency of a broadcast message sent by the broadcast sender and called by a broadcast recipient is less than or equal to the second preset frequency.

3. The method according to claim 2, wherein processing the registration of the broadcast receiver comprises:
   prohibiting the registration of the broadcast receiver when the type of the broadcast sender is the high-risk type;
   determining whether the broadcast recipient of the broadcast receiver is a preset broadcast recipient when the type of the broadcast sender is the risk type, and permitting the registration of the broadcast receiver when the broadcast recipient of the broadcast receiver is the preset broadcast recipient; and
   permitting the registration of the broadcast receiver when the type of the broadcast sender is the common type.

4. The method according to claim 3, further comprising:
   adjusting values of the first preset frequency and the second preset frequency according to a system load.

5. The method according to claim 4, wherein when a size of the system load is less than a preset size, the values of the first preset frequency and the second preset frequency are adjusted to increase; and
   when the size of the system load is greater than the preset size, the values of the first preset frequency and the second preset frequency are adjusted to reduce.

6. The registration method according to claim 3, wherein prohibiting the registration of the broadcast receiver comprises one of:
   restricting the registration of the broadcast receiver during a registration phase; and
   shielding the registration instruction of the broadcast receiver.

7. The method according to claim 1, wherein querying, after obtaining a registration instruction of the broadcast receiver and according to a registration object in a registration instruction, the type of the broadcast sender corresponding to the registration object comprises:
   determining a type of the broadcast recipient registering the broadcast receiver; and
   querying, when the type of the broadcast recipient is a preset type and according to the registration object in the registration instruction, the type of the broadcast sender corresponding to the registration object;
   wherein the preset type comprises a third-party application.

8. The method according to claim 7, wherein querying, after obtaining a registration instruction of the broadcast receiver and according to a registration object in a registration instruction, the type of the broadcast sender corresponding to the registration object further comprises:
   determining a type of the broadcast recipient registering the broadcast receiver; and
   completing the registration of the broadcast receiver when the type of the broadcast recipient is a system program.

9. The method according to claim 1, wherein the method comprises:
   after the recording the broadcast sender and a type of the broadcast sender determined in a classification result:
   redetermining the type of the broadcast sender after a preset time; and
   updating a recording result.

10. The method according to claim 1, wherein the frequency of the broadcast message sent by the broadcast sender and called by a broadcast recipient is determined by one of:
the number of times that the broadcast message is called by a broadcast recipient within a fixed time; and
the number of broadcast recipients that receive the broadcast message within a fixed time.

11. A terminal, comprising a processor, a non-transitory memory, and a computer program stored in the non-transitory memory and executed by the processor, wherein the processor is configured to execute the computer program to:
obtain a registration instruction of a broadcast receiver, wherein the registration instruction comprises a registration object;
determine, according to the registration object in the registration instruction and a predetermined classification result, a type of a broadcast sender corresponding to the registration object, wherein the predetermined classification result is obtained by classifying the broadcast sender according to a frequency of a broadcast message sent by the broadcast sender and by a broadcast recipient; and
process, according to the type of the broadcast sender, the registration of the broadcast receiver.

12. The terminal according to claim 11, wherein the processor is further configured to execute the computer program to obtain the predetermined classification result by:
classifying the broadcast sender according to the frequency of the broadcast message sent by the broadcast sender and called by a broadcast recipient; and
recording the broadcast sender and the type of the broadcast sender determined in the classification.

13. The terminal according to claim 12, wherein classifying the broadcast sender according to the frequency of the broadcast message sent by the broadcast sender and called by the broadcast recipient further comprises:
determining the type of the broadcast sender as a high-risk type, when the frequency of a broadcast message sent by the broadcast sender and called by a broadcast recipient is greater than a first preset frequency;
determining the type of the broadcast sender as a risk type, when the frequency of a broadcast message sent by the broadcast sender and called by a broadcast recipient is greater than a second preset frequency and less than or equal to the first preset frequency; and
determining the type of the broadcast sender as a common type, when the frequency of a broadcast message sent by the broadcast sender and called by a broadcast recipient is less than or equal to the second preset frequency.

14. The terminal according to claim 13, wherein the processor is further configured to execute the computer program to:
prohibit the registration of the broadcast receiver when the type of the broadcast sender is the high-risk type;
determine whether the broadcast recipient of the broadcast receiver is a preset broadcast recipient when the type of the broadcast sender is the risk type, and permitting the registration of the broadcast receiver when the broadcast recipient of the broadcast receiver is the preset broadcast recipient; and
permit the registration of the broadcast receiver when the type of the broadcast sender is the common type.

15. The terminal according to claim 13, wherein the processor is further configured to execute the computer program to:
adjust values of the first preset frequency and the second preset frequency according to a system load.

16. The terminal according to claim 15, wherein the processor is further configured to execute the computer program to:
adjust the values of the first preset frequency and the second preset frequency to increase when a size of the system load is less than a preset size; and
adjust the values of the first preset frequency and the second preset frequency to reduce when the size of the system load is greater than the preset size.

17. The terminal according to claim 11, wherein the processor is further configured to execute the computer program to:
determine a type of the broadcast recipient registering the broadcast receiver, and
query, when the type of the broadcast recipient is a preset type and according to the registration object in the registration instruction, the type of the broadcast sender corresponding to the registration object; wherein the preset type comprises a third-party application.

18. The terminal according to claim 17, wherein the processor is further configured to execute the computer program to:
determine the type of the broadcast recipient registering the broadcast receiver; and
complete the registration of the broadcast receiver when the type of the broadcast recipient is a system program.

19. The terminal according to claim 11, wherein the processor is further configured to execute the computer program to:
redetermine the type of the broadcast sender after a preset time; and
update a recording result.

20. A non-transitory computer readable storage medium, storing a plurality of instructions that, when executed by a computer, cause the computer to perform a method for registering a broadcast receiver, wherein the method comprises:
obtaining a registration instruction of the broadcast receiver, wherein the registration instruction comprises a registration object;
determining a type of a broadcast sender corresponding to the registration object according to the registration object and a classification of the broadcast sender, wherein the classification of the broadcast sender is obtained by classifying the broadcast sender according to a frequency of a broadcast message sent by the broadcast sender and called by a broadcast recipient; and
processing the registration of the broadcast receiver according to the type of the broadcast sender.

* * * * *